United States Patent
Wright et al.

(10) Patent No.: US 6,782,044 B1
(45) Date of Patent: Aug. 24, 2004

(54) RADIO INTERFERENCE DETECTION AND SCREENING SYSTEM FOR LOCOMOTIVE CONTROL UNIT RADIOS

(75) Inventors: Clive B. Wright, Germantown, MD (US); Hans Glista, Gaithersburg, MD (US)

(73) Assignee: Wabtec Corporation, Germantown, MD (US)

( * ) Notice: Subject to any disclaimer, the term of this patent is extended or adjusted under 35 U.S.C. 154(b) by 0 days.

(21) Appl. No.: 09/498,990

(22) Filed: Feb. 7, 2000

(51) Int. Cl.[7] .................. H04B 17/00; G06F 11/00
(52) U.S. Cl. ........................... 375/224; 714/704
(58) Field of Search .................... 375/224, 225–228; 340/825.61, 825.65, 825.69; 714/704, 706, 707

(56) References Cited

U.S. PATENT DOCUMENTS

| | | | | |
|---|---|---|---|---|
| 3,934,224 A | * | 1/1976 | Dulaney et al. | 714/750 |
| 4,370,648 A | * | 1/1983 | Wagner et al. | 340/825.2 |
| 5,271,035 A | * | 12/1993 | Cole et al. | 375/213 |
| 5,710,546 A | * | 1/1998 | Leitch | 340/7.25 |
| 6,216,095 B1 | * | 4/2001 | Glista | 702/117 |

* cited by examiner

Primary Examiner—Jean B. Corrielus
Assistant Examiner—Qutbuddin Ghulamali
(74) Attorney, Agent, or Firm—Webb Ziesenheim Logsdon Orkin & Hanson, P.C.

(57) ABSTRACT

A radio interference detection and screening system for performs on-locomotive testing of Locomotive Control Unit (LCU) radios. To eliminate bit errors during LCU sensitivity testing (also known as Bit Error Rate (BER) testing), the system detects interfering transmission signals which may cause bit errors in the transmission of test data, and suspends the LCU sensitivity performance testing during periods of detected external transmissions. Once the interfering transmissions are no longer detected by the system, the LCU then resumes the LCU sensitivity performance testing.

15 Claims, 3 Drawing Sheets

RADIO INTERFERENCE DETECTION AND SCREENING SYSTEM FOR LOCOMOTIVE CONTROL UNIT RADIOS

BACKGROUND OF THE INVENTION

1. Field of the Invention

The present invention generally relates to testing of railroad telemetry radios used in intra-train communications and, more particularly, to a radio interference detection and screening system for Locomotive Control Unit (LCU) radios.

2. Background Description

Locomotive Control Unit (LCU) radios (also known generally as a railroad telemetry radio) and End of Train (EOT) radios are complementary devices which communicate with each other as part of a complete information and control system to be used on freight trains as required by the Federal Railway Administration (FRA). The EOT is typically mounted on the last car of the train and monitors train information such as, for example, brake pipe air pressure, train movement, battery condition, etc., and transmits this information to the LCU. The information monitored by the EOT and transmitted via a radio frequency (RF) link to the LCU and is displayed to the crew in the locomotive.

Since the proper operation of the LCU in intra-train communications is critical, the LCU system is tested on a regular basis and preferably before each use. Thus, after a train has been "made-up" in the rail yard and the LCU and EOT installed, a functional test is performed to verify the overall operation of the LCU. This is done as part of the normal linking and arming sequence and verifies the functional operability of the LCU. This test does not check the performance limits of the LCU radios. To check radio performance, the LCU must normally be brought to a radio shop where the proper equipment is available, and requires opening the LCU enclosure to gain access to the radio.

One such test performed on the LCU is radio receiver sensitivity performance. The sensitivity performance testing is also referred to as Bit Error Rate (BER) testing. The sensitivity performance testing requires a very low amplitude test signal to be applied to the LCU (e.g., LCU receiver), where such low amplitude test signal is typically near the threshold of the LCU receiver's capability to receive error free messages. However, it has been found through experimental testing in the field that EOT transmissions occurring within a rail yard interfere with the low amplitude test signal. Thus, during the sensitivity performance testing of the LCU, a nearby EOT transmission may interfere with the testing of the LCU thus causing bit rate errors to be recorded. This, in turn, causes an incorrect BER test result.

What is thus needed is a system which is capable of testing an LCU without recording bit errors caused by interfering transmissions. This system would thus be able to accurately test the LCU in an RF hostile environment. The system would also be easy to implement with currently used LCU systems, including stand-alone or integrated LCU systems.

SUMMARY OF THE INVENTION

It is therefore an object of the present invention to provide a radio interference detection and screening system for on-locomotive testing of Locomotive Control Unit (LCU) radios.

It is still a further object of the present invention to provide a radio interference detection and screening system which eliminates bit errors caused by interference during testing of the LCU.

According to the invention, there is provided a radio interference detection and screening system and method of use for on-locomotive testing of Locomotive Control Unit (LCU) radios. The system and method of the present invention is adapted for use with a stand-alone LCU or an integrated LCU.

The system of the present invention includes a modulator connected to an RF communications test set. The modulator generates and continuously repeats a short pseudo-random message, arid the RF communications test set receives the message and impresses it onto a signal. A calibrated attenuator and connecting cable are connected between an LCU and the RF communications test set. The attenuator attenuates the message to a preferably low amplitude signal near the threshold of the LCU's capability to receive error free messages.

An RF interference detection module is connected to the LCU which is capable of detecting interfering transmissions. When the RF interference detection module detects an interfering transmission (e.g., EOT) it will notify the LCU of such detection. The LCU will then take corrective action in order to "compensate" for the interfering transmission. This corrective action includes the suspension of counting of the number of error free messages received from the RF communication test set during the time of the detected interfering signal. Once the RF interference detection module no longer detects the interfering transmissions, the LCU will resume counting the number of error free messages received from the RF communications test set until the completion of the sensitivity performance test. In this manner, bit errors caused by externally transmitted interference are completely eliminated and an accurate BER result may be obtained.

The present invention is also directed to a method of detecting and screening the interfering transmissions. The method of testing the LCU uses low amplitude signals near the threshold of the LCU's capability to receive error free messages. The method of the present invention further includes counting the low amplitude signals received by the LCU. After each bit of the low amplitude signal is counted, a determination is made as to whether an interfering signal is present. When an interfering signal is present, the method of the present invention provides a signal to the LCU to notify the LCU of such detection. The LCU will then suspend the counting of each received data bit, and will resume the counting of each received data bit when the interfering signal is no longer detected. A pass or fail message will be generated depending on an outcome of the counting and resuming steps.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

The present invention is directed to a radio interference detection and screening system for on-locomotive testing of Locomotive Control Unit (LCU) radios. To eliminate bit errors during LCU sensitivity performance testing (also known as Bit Error Rate (BER) testing), the system of the present invention detects all on-frequency interfering transmission signals which may cause such bit errors, and suspends the LCU sensitivity performance testing during the periods of such detected interfering transmissions. Once the interfering transmissions are no longer detected by the system of the present invention, the LCU then resumes the LCU sensitivity performance testing. Accordingly, by using the radio detection and screening system of the present invention, LCU sensitivity performance testing can be accurately performed in an RF hostile environment, such as, for example, a rail yard having several EOT transmissions which may otherwise interfere with the LCU sensitivity performance testing.

The radio detection and screening system of the present invention may be adapted for use with a stand-alone LCU or an integrated LCU. The stand-alone LCU includes a built-in user interface such as, for example, control switches and displays which allow the operator to monitor and control the LCU. The integrated LCU, on the other hand, does not include a built-in user interface since it normally interfaces to a locomotive computer through a communications port. By accessing this communications port with a personal computer (PC) (through an input/output (I/O) box), the operator can monitor and control the integrated LCU. Both the stand-alone LCU and the integrated LCU have a local microprocessor for performing the required functions of the LCU.

Stand Alone LCU Test Set-up

Figure 1:
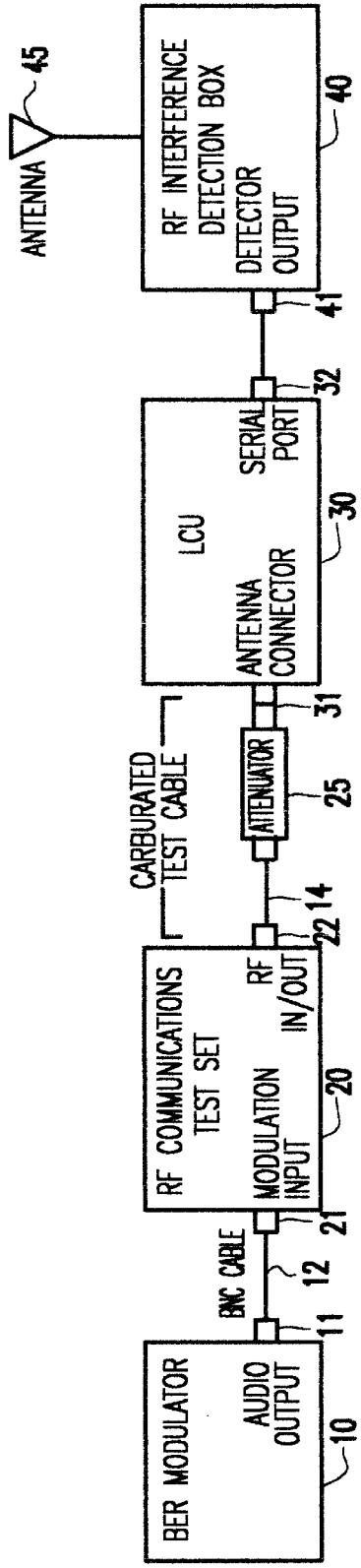
FIG. 1 is a block diagram showing a first embodiment of the present invention-used with a first type of LCU.

Referring now to FIG. 1, there is shown an LCU test set up for a stand-alone LCU. The test set up of FIG. 1 includes a BER modulator 10 having an audio output port 11. The audio output port 11 of the BER modulator 10 is connected to a modulation input port 21 of an RF communications test set 20 via a cable 12. The BER modulator 10 preferably generates and continuously repeats a short (63 bit) pseudo-random message (BER test message), and the RF communications test set 20 receives the short pseudo-random message and modulates a carrier signal. The modulated carrier signal is available at the RF input/output port 22 of the RF communications test set 20. An LCU 30 is connected to the RF input/output port 22 of the RF communication test set 20 via a calibrated attenuator 25 and connecting calibrated cable 14. The calibrated attenuator 25 is connected to an antenna connector 31 of the LCU 30. The calibrated attenuator 25 attenuates the BER test message signal to a preferably low amplitude value near the threshold of the LCU's capability to receive error free messages.

In the configuration of FIG. 1, the BER test message signal from the RF communications test set 20 is sent via the attenuator 25 to the LCU 30. The LCU 30 then processes the BER test messages by counting the total number of bits of the BER test messages as well as the total number of errorless bit error BER test messages received over a duration of the test period. The receiver sensitivity of the LCU is determined to be satisfactory if the number of errorless BER test messages received over the test interval is equal to a predetermined minimum value such as, for example, 1024 messages each being 63 bits long (64512 bits total). It should be well understood by one of ordinary skill in the art that the predetermined minimum value may be chosen depending on the particular set up of the present invention, and that the predetermined minimum value should preferably be set prior to the transmissions of the low amplitude signals.

However, EOT transmissions easily interfere with the low amplitude test signal applied to the LCU thus causing bit errors to be counted and recorded. These bit errors are the signals which are erroneously received by the LCU from the EOT interfering transmissions, and are due mainly to the LCU's ability to receive and record these interfering transmissions in conjunction with the low amplitude signals during the sensitivity performance testing. The counting and recording of these bit errors, in turn, causes an incorrect BER result and thereby may result in the LCU failing the sensitivity performance test.

In order to solve this problem, an RF interference detection box 40 is connected to a communications port 32 (i.e., serial port) of the LCU 30 via a detector output 41 of the RF interference detection box 40. The RF interference detection box 40 includes an antenna 45 which is capable of receiving interfering transmissions. When the RF interference detection box 40 detects the interfering transmissions it will notify the LCU so that the LCU can take corrective action. This corrective action will eliminate inaccurate BER results.

More specifically, when an interfering transmission is detected, the RF interference detection box 40 provides a signal to the LCU 30 indicating that an interfering transmission is detected. Once an interfering transmission is detected, the LCU 30 suspends counting of the errorless BER test messages received from the RF communication test set 20 during the time of the detected interfering signal. Once the RF interference detection box 40 no longer detects the interfering transmissions, the LCU 30 will resume counting the number of errorless BER test messages received from the RF communications test set 20 until the completion of the sensitivity performance test. In this manner, bit errors caused by transmission interference are completely eliminated and an accurate BER result may be obtained. At the end of the BER test, the LCU 30 may display a message such as, for example, "BER PASS" or "BER FAIL" depending on the outcome of the test; that is, whether the LCU has received the requisite number of errorless messages within the test interval. If the LCU fails the BER test, the LCU is removed from service for maintenance and repair.

Integrated LCU Test Set-up

Figure 2:
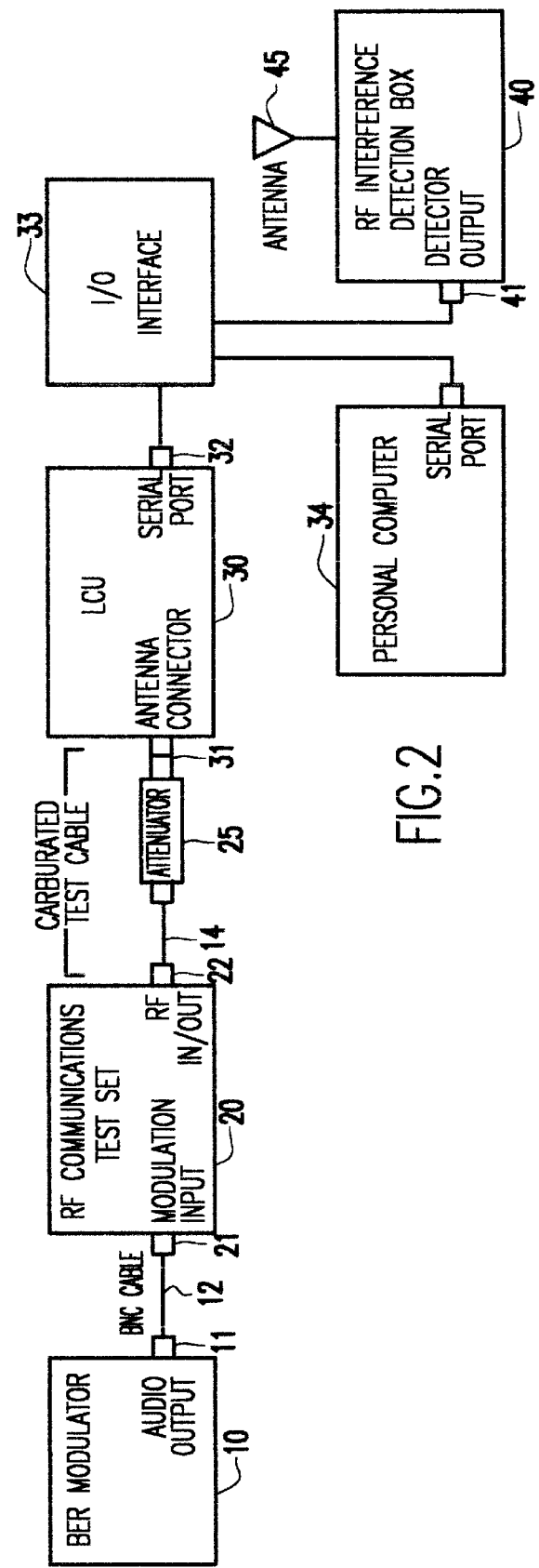
FIG. 2 is a block diagram showing a second embodiment of the present invention used with a second type of LCU.

FIG. 2 shows an LCU test set up for an integrated LCU. The embodiment of FIG. 2 includes many of the same components as the embodiment of FIG. 1 and is similarly used for sensitivity performance testing of the LCU radio receiver.

Referring now to FIG. 2, the BER modulator 10 is connected to the RF communications test set 20 via the cable 12. Similar to the embodiment of FIG. 1, the BER modulator 10 preferably generates and continuously repeats a short pseudo-random message (BER test message), and the RF communications test set 20 receives the pseudo-random message and modulates a carrier signal. The calibrated attenuator 25 and connecting cable 14 are connected between the LCU 30 and the RF communications test set 20.

Much like the discussion of FIG. 1, the attenuator 25 attenuates the BER test message signal to a preferably low amplitude value near the threshold of the LCU's capability to receive error free messages. In the configuration of FIG. 2, the BER test message signal from the RF communications test set 20 is sent via the attenuator 25 to the LCU 30.

Specific to the embodiment of FIG. 2, an I/O interface 33 is provided between a personal computer (PC) 34, the RF interference detection box 40 and the serial port 32 of the LCU 30. The personal computer 34 includes a user interface software program stored on its hard disk or, alternatively, stored on a floppy disk or other media which is inserted into the personal computer 34. The PC program allows the sensitivity performance testing to be performed on LCU systems which do not have a built in user interface. The RF interference detection box 40 is connected to the I/O interface 33 so that it may communicate with the LCU 30. The RF interference detection box 40 includes an antenna 45 for receiving interfering transmissions.

Similar to the embodiment of FIG. 1, once an interfering transmission is detected, the LCU 30 suspends the sensitivity performance testing (e.g., suspends counting the number of received errorless BER test messages) during the time of interfering signal detection. Once the RF interference detection box 40 no longer detects interfering transmissions, the LCU 30 will resume the sensitivity performance testing by again counting the number of errorless BER test messages received from the RF communications test set 20. In this manner, bit errors caused by interfering transmissions are thus completely eliminated and an accurate correct BER result may be obtained.

RF Interference Detection Box

Figure 3:
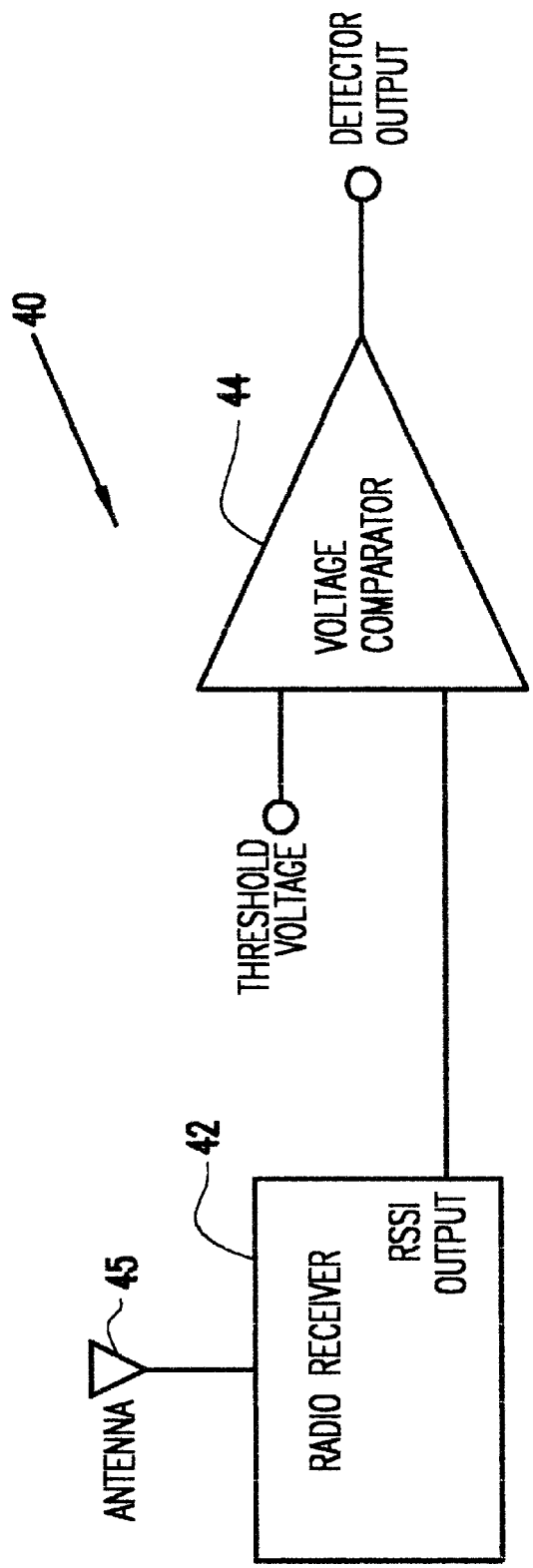
FIG. 3 is a block diagram showing an RF interference detection system of the present invention.

FIG. 3 shows the components of one specific RF interference detection box 40. However, it should be well understood by one of ordinary skill in the art of radio frequency design that the RF interference detection box 40 of FIG. 3 is only an illustrative example, and that other configurations having the same functional equivalents are also contemplated for use with the present invention.

Referring now to FIG. 3, the RF interference detection box 40 includes a radio receiver 42 for receiving interfering transmissions via the antenna 45. In the preferred embodiment, the radio receiver 42 is tuned to receive the EOT frequency and incorporates a radio signal strength indicator (RSSI). The RSSI output is a direct current voltage that is proportional to the received signal strength of the EOT frequency. A voltage comparator circuit 44 receives the direct current voltage of the RSSI output voltage and compares the direct current voltage to a reference voltage. If an interfering signal is present, the RSSI voltage increases causing the voltage comparator circuit 44 to trip and output a logic signal to the LCU 30 under test. The LCU 30 then suspends its counting operation until the interfering EOT transmission is no longer detected by the RF interference detection box 40.

Flow Diagram of Test Software

Figure 4:
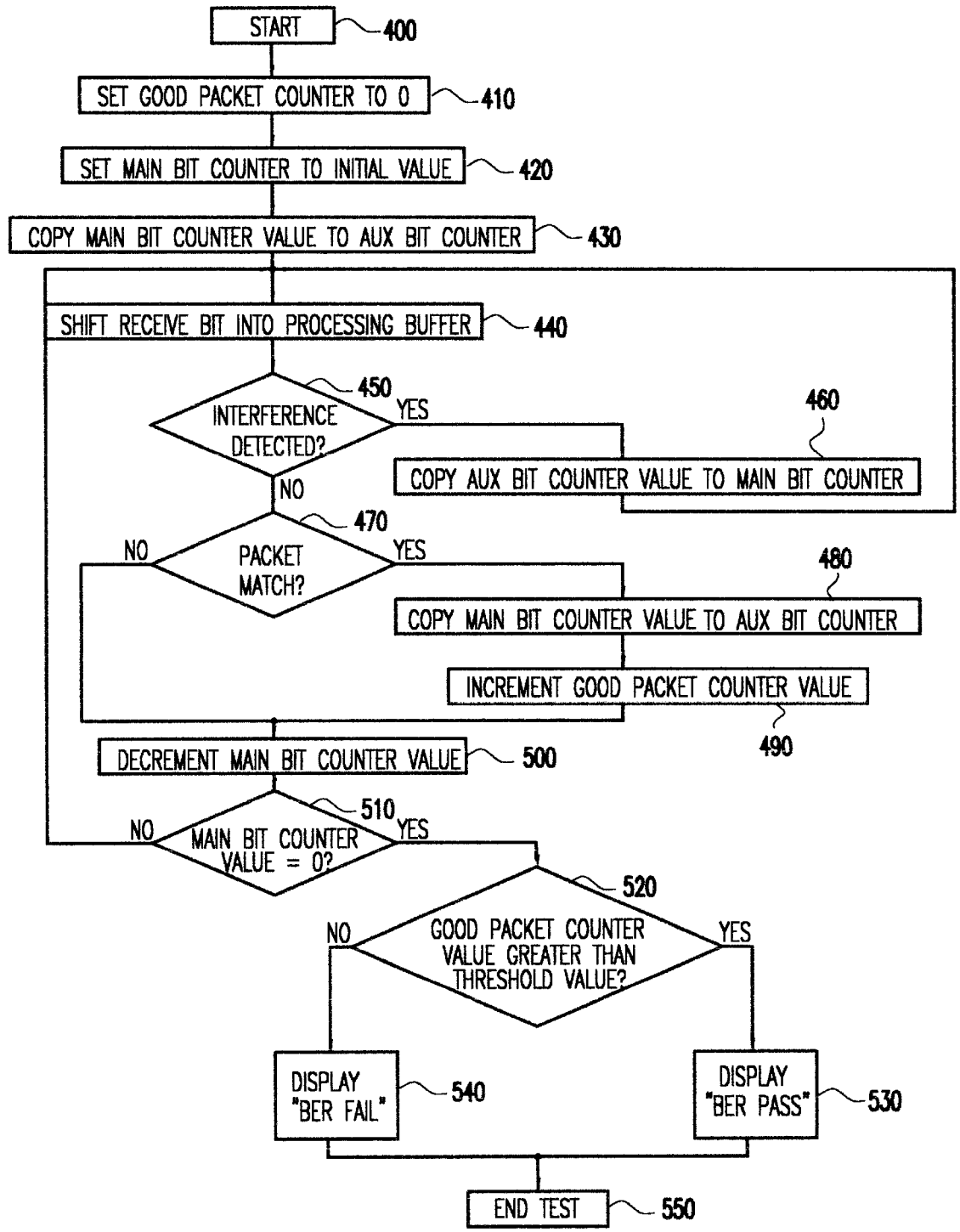
FIG. 4 shows a flow diagram illustrating the logic of the test program implemented either as an embedded program in the LCU of the first embodiment or as an embedded program with a personal computer (PC) user interface in the LCU of the second embodiment.

FIG. 4 is a flow diagram of the software used by the LCU during the sensitivity performance testing to ensure that EOT interfering transmissions do not result in an inaccurate BER result. It should be understood that FIG. 4 may equally represent a high level block diagram of the detection and screening system of the present invention which implements the steps of the flow diagram now depicted in FIG. 4.

It should also be well understood that the numbers and values such as, for example, the initial main bit counter value, described with reference to the flow diagram of FIG. 4, are provided for illustrative purposes only and that these numbers and values are not to be construed in any manner whatsoever as limiting the scope of the present invention. The steps of the flow diagram depicted in FIG. 4 apply to both an LCU of the stand-alone system and an LCU of the integrated system.

Referring now to FIG. 4, initialization of the software of the present invention is performed at function blocks 400–430. Specifically, the operations of the LCU start at block 400. At block 410, a "good" packet counter is set to "0". The "good" packet counter is the counter which counts the number of errorless BER test messages received by the LCU over the duration of the test. In this example, 1024 messages would be received if no bit errors occurred. At block 420, the main bit counter is set to an initial value, preferably but not limited to 64512 bits (1024 messages×63 bit length). (When the main bit counter is decremented to "0", the test is completed.) The software of the present invention then copies the value of the main bit counter to an auxiliary bit counter at block 430.

After the initialization is completed at function blocks 400–430, received data bits are shifted into a processing buffer in the LCU at block 440. In the preferred embodiment, the processing buffer may be 63 bits in length to accommodate a 63 bit message length.

After a single bit is processed at block 440, a determination is made as to whether an interfering signal is detected by the RF interference detection box at decision block 450. If an interfering signal is detected, then at block 460 the main bit counter is reset to the value of the auxiliary counter which contains the main bit counter value at the last good packet match. Further processing is bypassed and the next received data bit is shifted into the processing buffer at block 440.

If an interfering transmission is not detected at block 450, a determination is made as to whether there is a packet match at block 470. A packet match would indicate that a full errorless BER test message of 63 bits was transmitted and recorded by the LCU. If a packet match was determined at decision block 470, then the main bit counter value would be copied to the auxiliary bit counter at block 480. At block 490, the "good" packet counter would be incremented.

If a packet match was not determined at block 470 or after the "good" packet counter was incremented at block 490, the main bit counter value would be decremented at block 500. In the preferred embodiment, the main bit counter value is not decremented until a valid first message is transmitted and recorded. This ensures that the LCU is properly synchronized prior to the initiation of the sensitivity performance testing.

At block 510, a determination is made as to whether the main bit counter value is equal to "0". If the main bit counter is not equal to "0", steps associated with blocks 440–500 are repeated until the main bit counter value is equal to "0".

As now described with reference to blocks 440–510, if an interfering signal is detected the main bit counter is continually reset to its value at the last good match. Once the interfering signal is no longer detected, the main bit counter is decremented with reception of each data bit. The good packet counter is incremented with each reception of a good errorless message. In this manner, the interfering signal does not adversely affect the outcome of the test result since the counting of the bit messages is suspended, and the decremented value of the main bit counter is replaced with the saved value of the auxiliary bit counter.

After the processing of blocks 440–510 is completed, a determination is made as to whether the "good" packet counter value is greater than or equal to a threshold value (block 520) which may be any arbitrary number for a specific test. If the "good" packet counter value is greater than or equal to the threshold value, then a display indicates that the LCU has passed the sensitivity performance test at block 530. If the "good" packet counter value is not greater than or equal to the threshold value, then a display indicates that the LCU has not passed the sensitivity performance test at block 540. At block 550, the test is ended.

While the invention has been described in terms of preferred embodiments as particularly applied to LCU radios, those skilled in the art will recognize that the invention can be practiced with modification within the spirit and scope of the appended claims.

Having thus described my invention, what we claim as new and desire to secure by letters patent is as follows:

1. A system for testing a railroad telemetry radio using low amplitude test signals near a threshold of the railroad telemetry radio's capability to receive error free messages (Bit Error Rate (BER) test message data bits), comprising:

a first counter for counting the BER test message data bits detected by the railroad telemetry radio; and detection means for detecting interfering signals, the detection means providing a signal to the first counter when the interfering signals are detected, wherein the first counter suspends counting of received BER test message data bits during the detection of the interfering signal and resumes counting of the received BER test message data bits when the detection means no longer detects the interfering signals.

2. The system of claim 1, further comprising:

a second counter for counting the number of errorless test messages detected by the railroad telemetry radio, wherein the second counter counts the number of the errorless test messages while a predetermined number of the received BER test message data bits are counted by the first counter.

3. The system of claim 2, wherein:

the first counter is a main bit counter; and the second counter is a packet counter.

4. The system of claim 2, further comprising means for saving the counted number of received BER test message data bits received during an interval between a beginning of the test and a last received errorless test message.

5. The system of claim 4, wherein the means for saving the counted low amplitude test signals is an auxiliary bit counter.

6. The system of claim 2, further comprising means for returning a pass or fail message depending on whether the total number of counted received BER test message data bits equals the predetermined number and the total number of counted error free messages equal or exceed another predetermined number.

7. The system of claim 1, wherein the first counter and the detection means are embedded within a locomotive control unit associated with the railroad telemetry radio.

8. A method of testing a railroad telemetry radio using low amplitude test signals near a threshold of the railroad telemetry radio's capability to receive error free messages (Bit Error Rate (BER) test message data bits), comprising the steps of:

counting the BER test message data bits received by the railroad telemetry radio;

detecting whether an interfering signal is present and providing a signal to the railroad telemetry radio when the interfering signal is detected;

suspending the counting of the received BER test message data bits during the detecting of the interfering signal;

resuming the counting of the received BER test message data bits when the interfering signal is not detected; and returning a pass or fail message depending on an outcome of the counting and resuming steps.

9. The method of claim 8, further comprising:

setting a packet counter for counting the error free messages to zero;

setting a main bit counter to an initial value, the main bit counter counting the number of received BER test message data bits; and processing a series of bits of BER test message signals, wherein the interference detecting step is provided after processing each bit of the series of bits, and when the interfering signal is detected a value of an auxiliary counter is copied to the main bit counter.

10. The method of claim 9, further comprising determining whether a full errorless message was transmitted to the railroad telemetry radio when the interfering signal is not detected.

11. The method of claim 10, further comprising:

determining whether the main bit counter value is equal to zero; and determining whether counted error free messages exceed a threshold limit.

12. The method of claim 11, further comprising displaying a "PASS" or similar message when the number of error free messages is equal to or exceeds the threshold limit.

13. The method of claim 11, further comprising displaying a "FAIL" or similar message when the number of error free messages does not equal to or exceed the threshold limit.

14. The method of claim 11 further comprising incrementing the packet counter when the errorless message is transmitted to the railroad telemetry radio.

15. The method of claim 11, wherein the main bit counter value is not decremented until a valid first message is transmitted and recorded by the railroad telemetry radio to ensure that the railroad telemetry radio is properly synchronized prior to initiation of the testing.

\* \* \* \* \*